(12) United States Patent
Venkataswami et al.

(10) Patent No.: US 9,755,952 B2
(45) Date of Patent: *Sep. 5, 2017

(54) SYSTEM AND METHODS FOR LOAD PLACEMENT IN DATA CENTERS

(71) Applicant: DELL PRODUCTS L.P., Round Rock, TX (US)

(72) Inventors: Balaji Venkat Venkataswami, Chennai (IN); Bhargav Bhikkaji, San Jose, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/273,150

(22) Filed: Sep. 22, 2016

(65) Prior Publication Data

US 2017/0012860 A1 Jan. 12, 2017

Related U.S. Application Data

(63) Continuation of application No. 13/725,906, filed on Dec. 21, 2012, now Pat. No. 9,479,427.

(51) Int. Cl.
*H04L 12/707* (2013.01)
*H04L 12/24* (2006.01)
(Continued)

(52) U.S. Cl.
CPC ............. *H04L 45/22* (2013.01); *H04L 41/12* (2013.01); *H04L 45/02* (2013.01); *H04L 45/125* (2013.01);
(Continued)

(58) Field of Classification Search
CPC ....... H04L 45/00; H04L 45/04; H04L 45/026; H04L 45/14; H04L 45/44; H04L 47/10; H04L 69/40; H04L 45/28; H04L 45/22; H04L 41/0654; H04L 41/0659; H04L 41/12; H04L 45/02; H04J 14/0287; H04J 14/0293; H04J 14/0294; H04J 14/0295; H04B 10/032

See application file for complete search history.

(56) References Cited

U.S. PATENT DOCUMENTS 8,203,954 B1 6/2012 Patel
8,787,154 B1 7/2014 Medved
(Continued)

*Primary Examiner* — Ashley Shivers
(74) *Attorney, Agent, or Firm* — Haynes and Boone, LLP

(57) ABSTRACT

A system for operating information handling systems forming a network including a plurality of switches is provided. The system includes an open flow controller coupled to each of the plurality of switches; a plurality of links, each link configured to transmit data packets between two switches from the plurality of switches; wherein: the open flow controller is configured to determine a traffic flow across each of the plurality of links; and each one of the plurality of switches is configured to re-route a data packet when the traffic flow in a link associated to the switch exceeds a threshold. A computer program product including a non-transitory computer readable medium having computer readable and executable code for instructing a processor in a management unit for a plurality of information handling systems as above is also provided. A network managing device coupled to a service provider having resources is also provided.

20 Claims, 8 Drawing Sheets

(51) Int. Cl.
  *H04L 12/751* (2013.01)
  *H04L 12/703* (2013.01)
  *H04L 12/803* (2013.01)
  *H04L 12/729* (2013.01)
  *H04L 12/801* (2013.01)
  H04L 12/931 (2013.01)
  H04L 12/723 (2013.01)

(52) U.S. Cl.
  CPC ............ *H04L 45/28* (2013.01); *H04L 47/122* (2013.01); *H04L 47/29* (2013.01); *H04L 45/50* (2013.01); *H04L 49/70* (2013.01)

(56) References Cited

U.S. PATENT DOCUMENTS

| | | |
|---|---|---|
| 8,908,539 B1 | 12/2014 | Pani |
| 2003/0084141 A1 | 5/2003 | Hofkens et al. |
| 2006/0088063 A1 | 4/2006 | Hartung et al. |
| 2011/0087799 A1 | 4/2011 | Padhye et al. |
| 2011/0267954 A1 | 11/2011 | Seetharaman |
| 2011/0283016 A1 | 11/2011 | Uchida |
| 2011/0286324 A1 | 11/2011 | Bellagamba |
| 2012/0124235 A1* | 5/2012 | Nandagopal ............ H04L 45/12 709/238 |
| 2013/0077475 A1 | 3/2013 | Enyedi |
| 2013/0086236 A1 | 4/2013 | Baucke |
| 2013/0223440 A1 | 8/2013 | DeCusatis |
| 2014/0089506 A1 | 3/2014 | Puttaswamy et al. |
| 2014/0098815 A1 | 4/2014 | Mishra et al. |
| 2014/0169158 A1 | 6/2014 | Mishra et al. |

* cited by examiner

SYSTEM AND METHODS FOR LOAD PLACEMENT IN DATA CENTERS

RELATED APPLICATIONS

This application is a continuation of U.S. patent application Ser. No. 13/725,906, filed Dec. 21, 2012, which is hereby incorporated by reference in its entirety.

BACKGROUND

1. Technical Field

The present disclosure is related to the field of network traffic management. More specifically, the present disclosure is related to load placement in data center networks.

2. Description of Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use similar to financial transaction processing, airline reservations, enterprise data storage, or global communications. In addition, information handling systems may include a variety of hardware and software components that may be configured to process, store, and communicate information and may include one or more computer systems, data storage systems, and networking systems.

Traditional data center networks include a top of rack (TOR) switch layer, an aggregation switch layer, and a backbone switch layer. In data center networks for data packet routing, data flow is established and forwarded using static hash functions when there exists more than one path to the destination from a switch. Static hash functions do not consider the current load on specific links in allocating the flow through the link. Moreover, static hash functions may be biased as they merely perform regular hash operations on fixed header fields. As a result of such biasing, traffic load through the network links may be highly polarized. Thus, while some links may bear the burden of a high traffic load, other links at the same layer level may have little or no traffic flowing through. This leads to imbalance and inefficiencies in the data center network traffic management.

In state-of-the-art data center networks a node failure or a link failure typically is resolved by re-routing traffic at a point close to, or directly on, the point of failure. Furthermore, in state-of-the-art data center networks a node failure or a link failure is resolved after a failure notification is sent to a controller or manager, at which point the controller or manager makes the re-routing decision. This failure recovery process is time consuming and results in inefficient re-routing architectures and results in time periods where the traffic is black-holed.

What is needed is a system and a method for load placement in a data center that uses current traffic information through the links in the system. Also needed is a system and a method to engineer data traffic in order to avoid congested links in a data center network. Further needed is a system and a method for resolving node failure and link failure in a data center network.

SUMMARY

According to embodiments disclosed herein, a system for operating a plurality of information handling systems forming a network may include a plurality of switches; an open flow controller coupled to each of the plurality of switches; a plurality of links, each link configured to transmit data packets between two switches from the plurality of switches; wherein: the open flow controller is configured to determine a traffic flow across each of the plurality of links; and each one of the plurality of switches is configured to re-route a data packet when the traffic flow in a link associated to the switch exceeds a threshold.

A computer program product in embodiments disclosed herein may include a non-transitory computer readable medium having computer readable and executable code for instructing a processor in a management unit for a plurality of information handling systems forming a network to perform a method, the method including performing a discovery of the network topology; receiving a load report for a link between information handling systems in the network; determining a flow rate for a link in the network; and computing a label switch path.

A network managing device according to embodiments disclosed herein is configured to be coupled to a service provider having resources, and to be coupled to a storage component and a computational component to provide a service to a plurality of users through a network may include a link to a plurality of switches; a processor circuit configured to discover a topology of the network, to determine a flow rate for a link in the network, and to compute a label switch path; and a memory circuit to store the label switch path and the topology of the network.

These and other embodiments will be described in further detail below with reference to the following drawings.

BRIEF DESCRIPTION OF THE DRAWINGS

In the figures, elements having the same reference number have the same or similar functions.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources similar to a central processing unit (CPU) or hardware or software control logic, ROM, and/or other types of nonvolatile memory. Additional components of the information handling system may include one or more disk drives, one or more network ports for communicating with external devices similar to various input and output (IO) devices, similar to a keyboard, a mouse, and a video display. The information handling system may also include one or more buses operable to transmit communications between the various hardware components.

Figure 1:
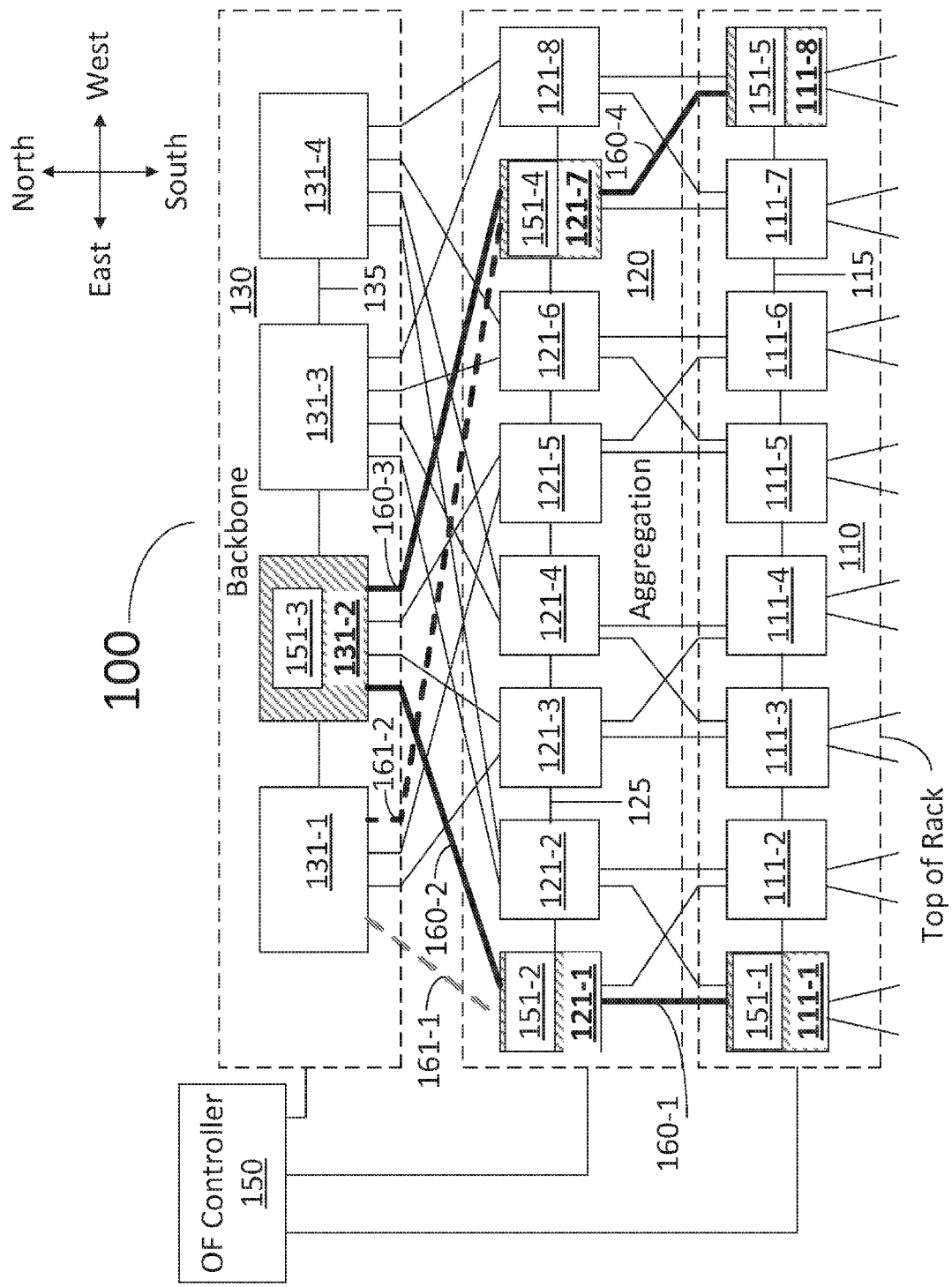
FIG. 1 shows a data center network, according to some embodiments.

FIG. 1 shows a data center network 100, according to some embodiments. Data center network 100 includes three layers of nodes, or switches. A top-of-rack (TOR) layer 110 includes switches 111-1, 111-2, 111-3, 111-4, 111-5, 111-6, 111-7, and 111-8, collectively referred hereinafter as TOR switches 111. TOR switches 111 normally are placed on top of server racks at server locations. An aggregation layer 120 may include switches 121-1, 121-2, 121-3, 121-4, 121-5, 121-6, 121-7, and 121-8, collectively referred hereinafter as aggregation switches 121. A backbone layer 130 may include switches 131-1, 131-2, 131-3, and 131-4, collectively referred hereinafter as backbone switches 131. Data center network 100 may also include Open Flow (OF) controller circuit 150. In some embodiments, OF controller 150 configures switches 111, 121, and 131 in order to handle the traffic flow through data center network 100. OF controller 150 is coupled to each of switches 111, 121, and 131 in data center network 100. FIG. 1 shows eight (8) TOR switches 111, eight (8) aggregation switches 121, and four (4) backbone switches 131 for illustrative purposes only. One of ordinary skill would recognize that there is no limitation in the number of switches that may be included in each of a TOR layer, an aggregation layer, and a backbone layer. Data traffic in data center network 100 may be unicast (point-to-point transmission). In some embodiments the data traffic may be multicast (single-point-to-multiple point transmission).

Data center network 100 also includes links between the switches, so that data packets may be transmitted from one switch to the other. The switches shown in FIG. 1 include four ports each, coupled to links. In some embodiments, each of TOR switches 111 may include two ports in the 'south' direction, coupling the TOR switches to the servers in a server layer. Also, in some embodiments each of TOR switches may include two ports in the 'north' direction, coupling each of the TOR switches with at least two aggregation switches 121. Likewise, each of aggregation switches 121 may include two ports in the 'south' direction coupling each aggregation switch 121 with at least two TOR switches. Also, in some embodiments each of aggregation switches 121 may include two ports in the 'north' direction coupling each aggregation switch 121 with at least two backbone switches 131. In some embodiments, backbone layer 130 may be the top most layer in the data center network. Thus, ports in each backbone switch 131 may couple the switch to four aggregation switches 121 in the 'south' direction. The specific number of ports for switches 111, 121, and 131 is not limiting of the embodiments of the present disclosure. Furthermore, in some embodiments a switch in any one of TOR layer 110, aggregation layer 120, and backbone layer 130, may include one or more ports in the East or West direction, coupling the switch to at least another switch in the same layer level. For example, link 115 couples switches 111-6 and 111-7 in an East-West direction in TOR layer 110. Likewise, link 125 couples switches 121-2 and 121-3 in an East-West direction in aggregation layer 120. And link 135 couples switches 131-3 and 131-4 in backbone layer 130.

Accordingly, an ingress data packet in TOR switch 111-1 may be transmitted to aggregation switch 121-1 through link 160-1. From aggregation switch 121-1, the ingress data packet may be routed to backbone switch 131-1 through link 161-1. Backbone switch 131-1 may transmit the data packet to aggregation switch 121-7 through link 161-2. Aggregation switch 121-7 may transmit the data packet to TOR switch 111-8 through link 160-4, so that the ingress data packet becomes an egress data packet and is forwarded to the appropriate server below TOR switch 111-8.

According to some embodiments, link 161-1 between aggregation switch 121-1 and backbone switch 131-1 may have a heavy traffic polarization with respect to link 160-2. Link 160-2 couples aggregation switch 121-1 and backbone switch 131-2. For example, while link 161-1 may carry about nine (9) Gigabit per second (GBs) of data flow, link 161-2 may carry only one (1) or less GBs of data flow. Accordingly, OF controller 150 may decide to re-route the ingress data packet from link 161-1 to link 160-2, using a re-routing strategy. The decision to re-route the ingress data packet may be triggered when a traffic flow in a link exceeds a pre-selected threshold value. The pre-selected threshold value may be 5 GBs, 6 GBs, or more, according to the number of ports and configuration of the switch supporting the link.

In embodiments where OF controller 150 uses a multiple protocol label switching (MPLS) configuration as a re-routing strategy, labels 151-1, 151-2 151-3, 151-4, and 151-5 (collectively referred hereinafter as labels 151) are placed in headers of the ingress data packet. Labels 151 include flow identifiers used to establish a route for the ingress data packet through the data center network. In some embodiments, flow identifiers may be included in an N-tuple, in labels 151. A flow is identified by an associated N-tuple. In some embodiments, an N-tuple may include information such as IP-Source-Address, Destination-IP-Address, Source-Port number, Destination Port-number, and Protocol type. Typically, a flow identifier related to a five-tuple as described above may be used by OF controller 150 for setting up flow information.

In some embodiments an N-tuple may include a Source Mac-Address and a Destination Mac-Address. Further according to some embodiments, an N-tuple may be a two-tuple including the Source MAC and the destination MAC alone. The contents of an N-tuple may identify traffic flow passing through the router in a given direction, or in both directions.

Labels 151 may be placed in headers of the ingress data packets by each of the switches receiving the packets. For example, switch 111-1 may 'push' label 151-1 in the ingress data packet in switch 111-1. Label 151-1 routes the data packet through link 160-1. Further, aggregation switch 121 may 'swap' label 151-1 with label 151-2 in the data packet header. Label 151-2 routes the data packet through link 160-2 towards backbone switch 131-2, instead of using link 161-1 to backbone switch 131-1. Thus, switch 121-1 reduces the traffic load through link 161-1, effectively balancing the load between links 161-1 and 160-2. Backbone switch 131-2 may 'swap' label 151-2 in the data packet header with label 151-3, re-routing the data packet through link 160-3 towards aggregation switch 121-7. Aggregation switch 121-7 may 'swap' label 151-3 with label 151-4, routing the data packet through link 160-4 toward TOR switch 111-8. Switch 111-8 may then 'pop' or remove label 151-5 from the data packet header, and forward the data packet to the intended recipient.

Accordingly, OF controller 150 may prepare and distribute labels 151 to each of switches 111-1, 121-1, 131-2, 121-7, and 111-8 when a load imbalance is detected between links 161-1 and 160-2. Thus, a data packet may have a re-routing trace assigned at the point of ingress to the data center network. This strategy reduces the time delay introduced in the data center network for load balancing. Also, embodiments using this strategy are able to distribute traffic flow comprehensively through the data center network. For example, OF controller 150 may use knowledge of the data center network topology to implement a re-routing strategy that results in load balancing in distant nodes.

Figure 2:
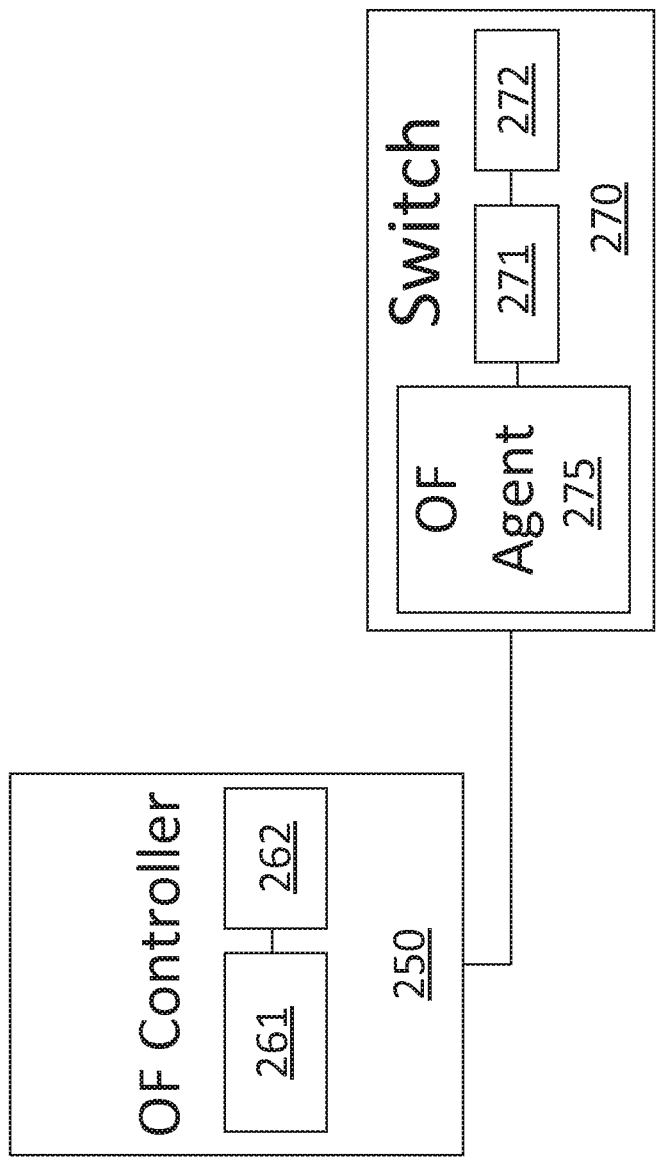
FIG. 2 shows an open flow (OF) controller coupled to a switch, according to some embodiments.

FIG. 2 shows an OF controller 250 coupled to a switch 270, according to some embodiments. OF controller 250 and switch 270 may be as OF controller 150 and any one of TOR switches 111, aggregate switches 121, or backbone switches 131, in data center network 100 (cf. FIG. 1). OF controller 250 may include a processor circuit 261 and a memory circuit 262. Memory circuit 262 stores commands and data used by processor circuit 261 to execute operations on switch 270, through an OF agent 275. Switch 270 includes processor circuit 271 and memory circuit 272. Memory circuit 272 stores commands and data used by processor circuit 271 to perform the tasks of switch 270. According to some embodiments, the commands stored in memory circuit 272 may be provided by OF controller 250 through OF agent 275. In particular, in some embodiments OF agent 275 provides an operating system to processor circuit 271 in order to execute the commands stored in memory circuit 272.

Thus, OF controller 250 may instruct OF agent 275 to 'push,' 'swap,' or 'pop' a label on a data packet header in a re-routing configuration using labels 151, as described in detail above in relation to FIG. 1. A 'push' instruction includes writing a label in the data packet header. A 'swap' instruction includes replacing a first label with a second label in the data packet header. A 'pop' instructions includes removing a label from the data packet header.

According to embodiments disclosed herein, switch 270 may be a hybrid switch configured by OF agent to operate in an open flow environment. A hybrid switch may also be configured to perform bidirectional forwarding detection (BFD) sessions with neighbors in a data center network. In a BFD session, switch 270 sends a test packet, or hand-shake packet to a neighbor switch, expecting a return of the packet after a certain period of time. When the hand-shake packet fails to return to switch 270, switch 270 may determine that the destination switch, or a link to the destination switch, has failed. Likewise, during a BFD session switch 270 may return a hand-shake packet to a neighbor in the data center network. In some embodiments, a BFD session may involve only nearest neighbors, so that the hand-shake takes place across a single-hop. In some embodiments a BFD session may involve a plurality of hops in the data center network. In such embodiments, the BFD session is a multi-hop session where the neighbor with which the BFD session is being run is multiple hops away and not an immediate neighbor. When a failure is discovered during a BFD session, a flag may be raised on OF agent 275. Thus, OF agent 275 may send a report to OF controller 250. OF agent 275 may also provide commands to processor 271 in switch 270 without waiting for instructions from OF controller 250.

In some embodiments, a BFD session may be run on the switches to detect single hop failures. In some instances a BFD session may detect multi-hop failures. Some embodiments may include pre-built bypass paths for specific links, using BFD sessions. Once the pre-built bypass paths are computed, they may be downloaded to the OF Agent in the switch running the BFD session. Thus, when the BFD session detects failure then bypass paths are installed in the hardware to perform a fast failover.

In embodiments where switch 270 is a hybrid switch, OF agent 275 may store in memory circuit 272 a fast re-route (FRR) set of paths for re-routing data packets through switch 270. The FRR set of paths may include links and IP addresses of switches in data center network 100. According to some embodiments, each path in the FRR set may be associated to switch 270 and to a failed link, a failed switch, or a combination of a failed link and a failed switch. For example, each path in the FRR set includes paths having switch 270 as a node, excluding a failed link coupled to switch 270, or a failed switch coupled to switch 270. Furthermore, the FRR set may exclude a combination of a link and a switch coupled to switch 270, both of which may have a failure at some point in time.

Data plane programming is done through OF agent 275 in switch 270. For example, data plane programming may include computing the FRR set of paths by the OF controller. OF controller 250 may in turn pass the FRR set of paths for circuit 270 to OF agent 275. Thus, by computing the FRR sets the OF controller in a data center network 100, has a comprehensive image of the traffic architecture across data center network 100 and their respective backup paths.

Figure 3:
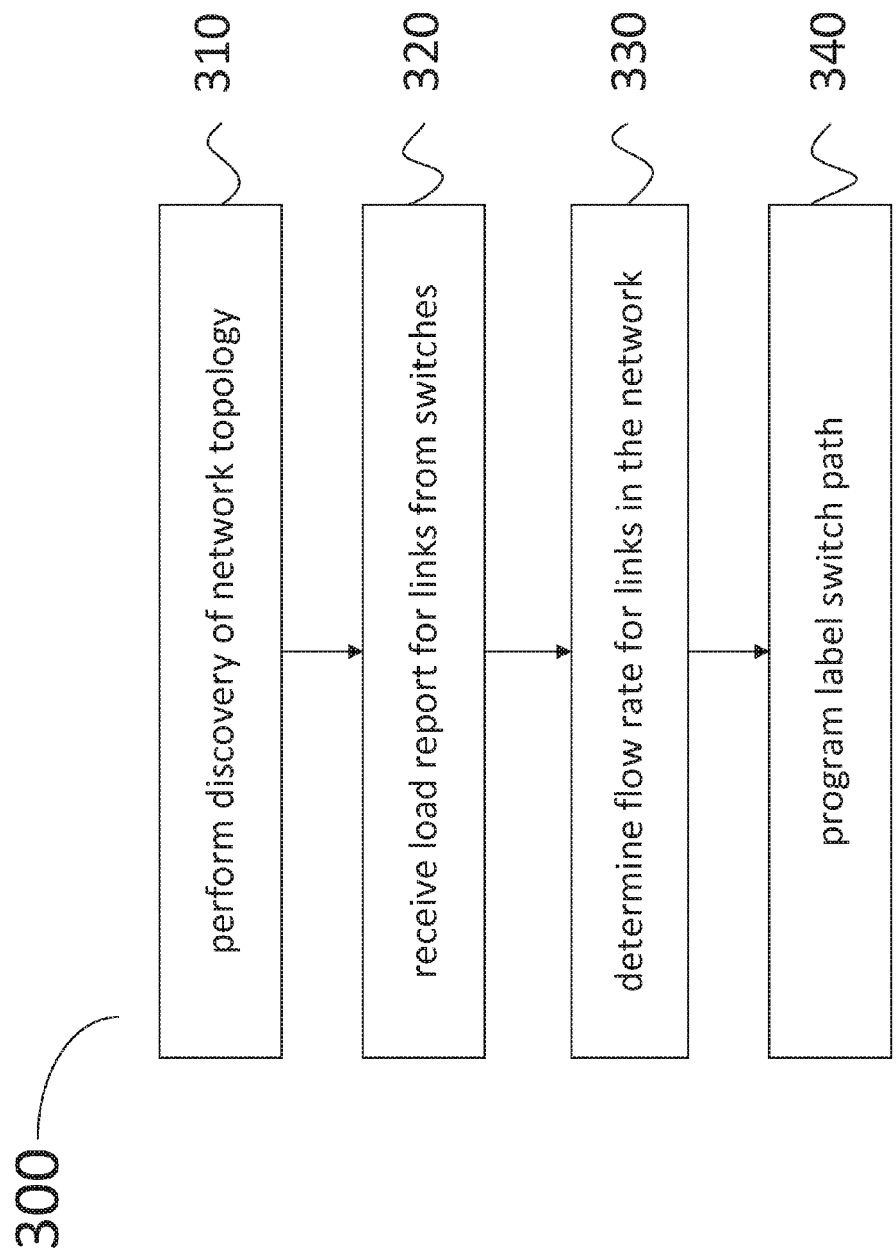
FIG. 3 shows a flow chart of a method for load placement in a data center network, according to some embodiments.

FIG. 3 shows a flow chart of a method 300 for load placement in a data center network, according to some embodiments. Some embodiments may deploy an OF controller such as OF controller 150 in data center network 100 (cf. FIG. 1). Thus, method 300 may be performed by processor circuit 261 executing commands stored by memory circuit 262 in OF controller 250. The OF controller may execute operations on the switches and links of the data center network, as described in detail above (cf. FIG. 1). In some embodiments, an OF controller deployed in a data center network may be coupled to each of the switches in the data center network through an OF agent such as OF agent 275 (cf. FIG. 2). Thus, in some embodiments steps in method 300 may be partially performed by a processor circuit in some OF agents in the data center network, upon configuration by the OF controller. The processor circuit coupled to an OF agent in a switch may be similar to processor circuit 271, performing commands stored in memory circuit 272 (cf. FIG. 2).

In step 310, OF controller 150 performs topology discovery and creates a database of the data center network. In step 320 top of rack, aggregation, and backbone switches report traffic flow rates on each of their links to the OF controller. In step 330 OF controller 150 determines flow rates to specific links in the data center network. In step 340 forwarding entries are programmed in the form of one level multiple protocol label switching (MPLS) labels mapped to flow entries.

Figure 4:
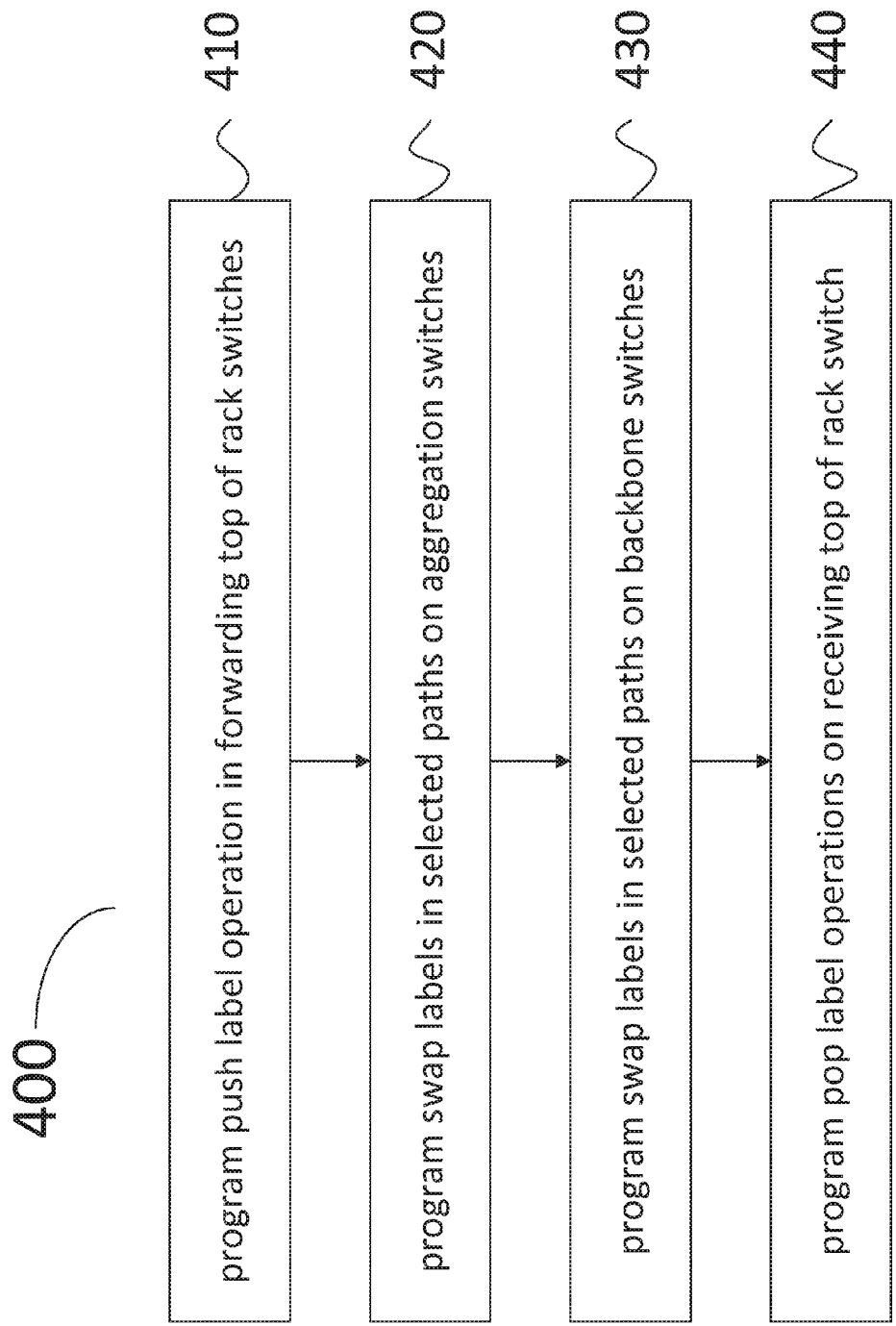
FIG. 4 shows a flow chart of a method for load placement in a data center network, according to some embodiments.

FIG. 4 shows a flow chart of a method 400 for load placement in a data center network, according to some embodiments. In some embodiments, method 400 may be performed by processor circuit 261 executing commands stored in memory circuit 262 in OF controller 250. Furthermore, in some embodiments steps in method 400 may be partially performed by a processor circuit in some OF agents in the data center network, upon configuration by the OF controller. The data center network in method 400 may be as data center network 100 described in detail above (cf. FIG. 1).

In step 410 the OF controller programs a 'push label' operation in forwarding top of rack switches. The OF controller may perform step 410 by determining the flow rate to specific links in TOR layer 110 with 'push label' and flow entry programming operations. In step 420, the OF controller programs 'swap label' operations in less loaded paths on switches in aggregation layer 120. In step 430 the OF controller programs swap labels in less loaded paths on switches in backbone layer 130. In step 440 the OF controller programs POP label operations on receiving switch in TOR layer 110.

Figure 5:
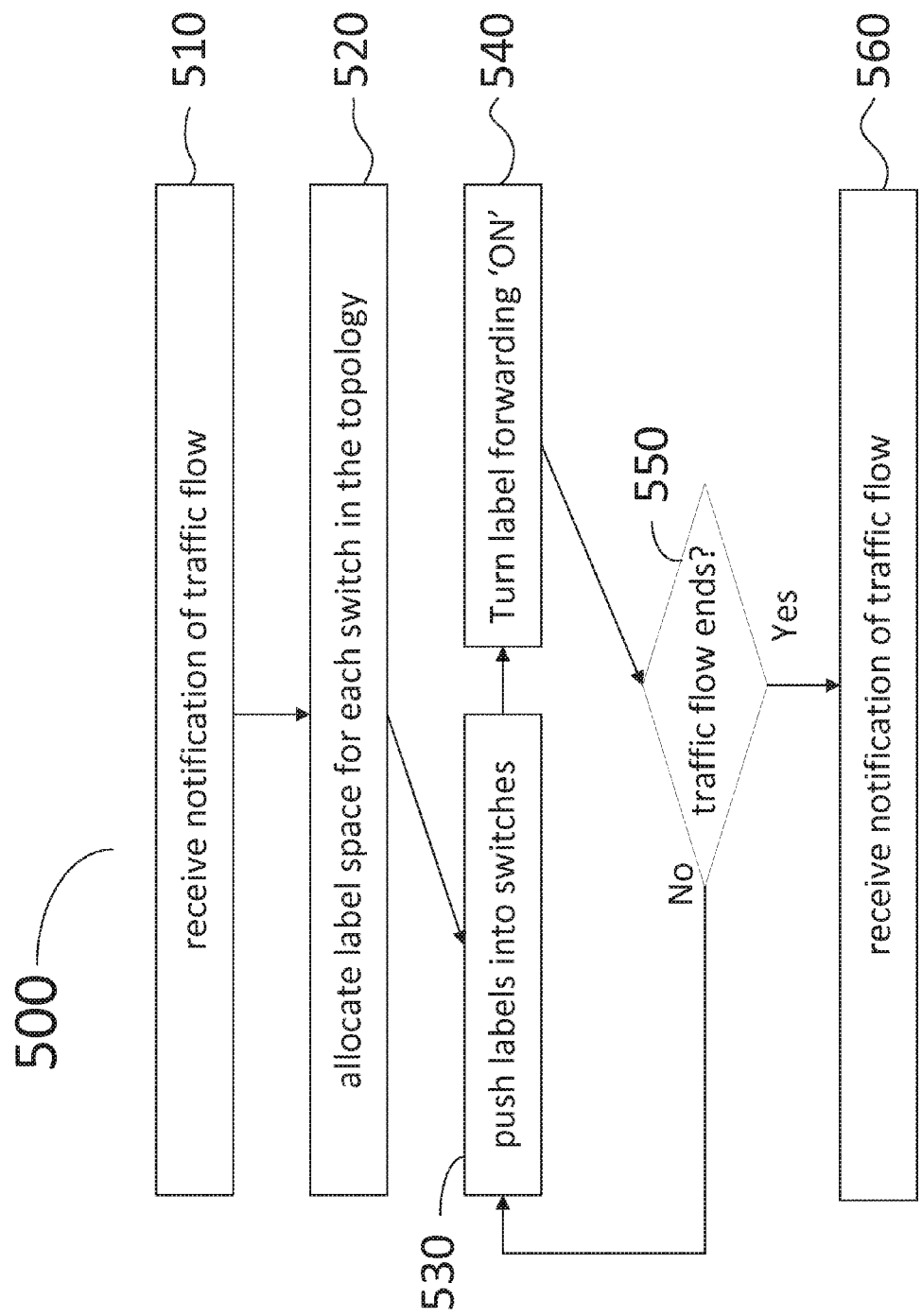
FIG. 5 shows a flow chart of a method for load placement in a data center network, according to some embodiments.

FIG. 5 shows a flow chart of a method 500 for load placement, according to some embodiments. In some embodiments, method 500 may be performed by processor circuit 261 executing commands stored in memory circuit 262 in OF controller 250. Furthermore, in some embodiments some of the steps in method 500 may be partially performed by a processor circuit in some OF agents in the data center network, upon configuration by the OF controller. The data center network in method 500 may be similar to data center network 100 described in detail above (cf. FIG. 1).

In step 510 the OF controller receives notification of traffic flow through data center network 100. In some embodiments, traffic flow information may be included in the appropriate N-tuple. In step 520 the OF controller allocates label space for each switch in the topology based on the switch's layer. When labels are pushed into switches in step 530, label based forwarding is set to 'ON' in the switches in step 540. Thus, the data packet may be forwarded to the address specified in the label. When step 550 determines an end flow status, the OF controller receives notification in step 560. Also in step 560, the OF controller releases the labels from the paths. In some embodiments, the flow information may be an aggregate entry such as a prefix rather than a complete IP address within a N-Tuple. This aggregate entry would indicate entire sub-networks or networks reachable at the far ends of the data center. Thus achieving a minimization of flow information space occupancy in the hardware tables of the switch.

Figure 6:
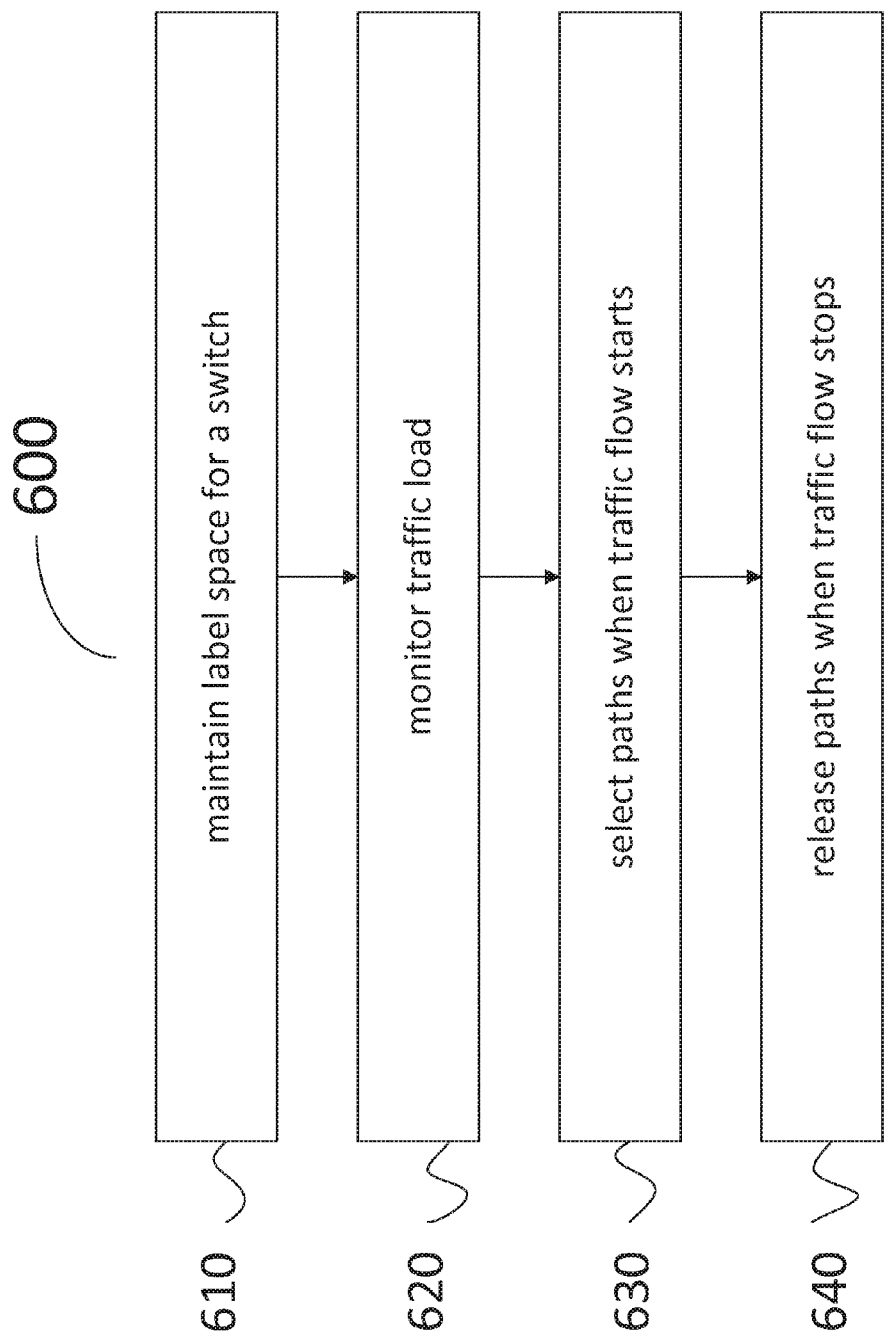
FIG. 6 shows a flow chart of a method for load placement in a data center network, according to some embodiments.

FIG. 6 shows a flow chart of a method 600 for load placement in a data center network, according to some embodiments. In some embodiments, method 600 may be performed by processor circuit 261 executing commands stored in memory circuit 262 of OF controller 250. Furthermore, in some embodiments some of the steps in method 600 may be partially performed by a processor circuit in some OF agents in the data center network, upon configuration by the OF controller. The data center network in method 600 may be as data center network 100 described in detail above (cf. FIG. 1).

In step 610 the OF controller maintains label space for each switch. In step 620 the OF controller constantly monitors traffic load through the data center network. Accordingly, in some embodiments step 620 includes monitoring traffic load through the data center network periodically. The periodicity in step 620 is not limiting and may vary from a few seconds up to minutes, or more. In some embodiments including a particularly large data center network, the OF controller may sequentially poll each of the nodes in step 620. In step 630 the OF controller may select paths when traffic flow starts. In step 640 the OF controller releases paths when traffic flow ends.

Figure 7:
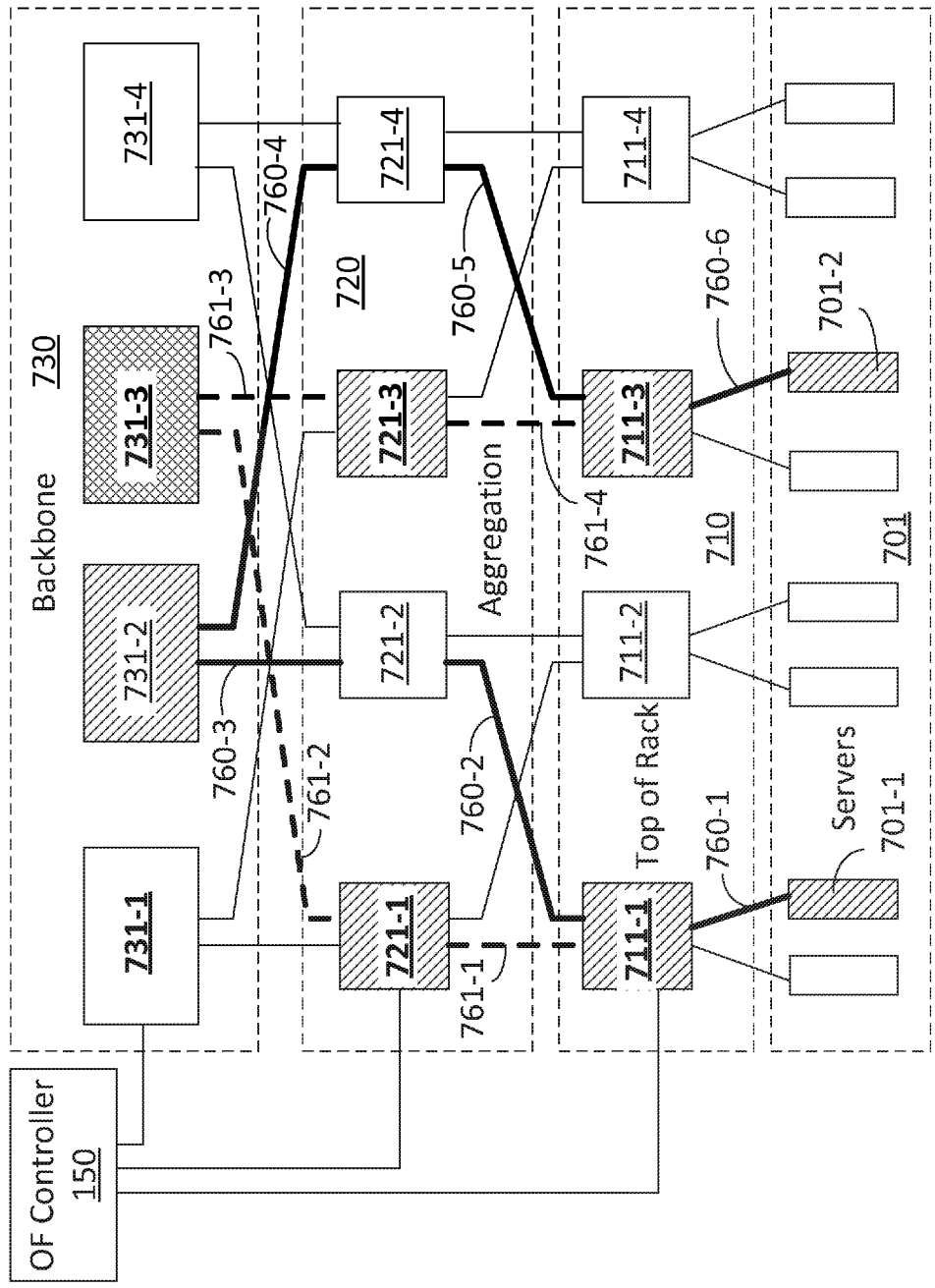
FIG. 7 shows a data center network configured for a node failure recovery, according to some embodiments.

FIG. 7 shows a data center network 700 configured for a node failure recovery, according to some embodiments. In some embodiments, the configuration of data center network 700 may be used under any circumstance where traffic re-routing may be desired. Data center network 700 may include a server layer 701, according to some embodiments. Data center network 700 may include a TOR layer 710, and aggregate layer 720, and a backbone layer 730. Thus, TOR layer 710 may include TOR switches 711-1, 711-2, 711-3, and 711-4. Aggregate layer 720 may include aggregate switches 721-1, 721-2, 721-3, and 721-4. And backbone layer 730 may include backbone switches 731-1, 731-2, 731-3, and 731-4. Data center network 700 may be configured for fail-re-routing (FRR) orchestration using bidirectional forwarding detection (BFD) between two nodes of the network.

Embodiments disclosed herein may include FRR providing a 'make-before-break' solution for protecting traffic flow in data center network 700. Accordingly, in some embodiments when a node or link failure occurs in data center network 700, the failure may be resolved without involving OF controller 150. In some embodiments OF controller 150 calculates possible FRRs for each of the nodes and links in data center network 700. The FRRs are stored by the OF agents associated with each node in the data center network, in memory circuit 272 (cf. FIG. 2). When a failure occurs at a particular point, traffic is rerouted according to the FRR associated with the point of failure. Thus, some embodiments reduce the round trip time for failure correction in the data center network by involving the OF agent installed locally on each of the nodes or switches in the network (cf. OF agent 275 in FIG. 2).

In some embodiments, the OF agent may install the FRR set for a particular TOR-Aggregation-Backbone combination of nodes in the hardware, and use the installed FRR set as backup paths for various scenarios. According to some embodiments, the OF agent may store the backup FRR set in memory. Thus, in the event of failure the FRR set is installed in the hardware (e.g., in the switches in data center network 700). OF controller 150 computes multiple FRR paths for each node or switch in data center network 700. OF controller 150 is able to perform such computation by using detailed knowledge of the topology of data center network 700.

According to some embodiments, each switch in data center network 700 is locally configured for BFD with respective adjacent layers. For example, switch 721-1 in aggregation layer 720 may be configured to perform BFD with a switch in backbone layer 730 (e.g., 731-1 or 731-2), and also with a switch in TOR layer 710 (e.g., 711-1 or 711-2). Likewise, in some embodiments switch 711-1 in TOR layer 710 may be configured to perform BFD with a switch in aggregation layer 720. And switch 731-1 in backbone layer 730 may be configured to perform BFD sessions with a switch in aggregation layer 720.

FIG. 7 shows an exemplary scenario wherein a failure is detected in backbone switch 731-3. Thus, a data packet route from server 701-1 to server 701-2 through links 760-1, 761-1, 761-2, 761-3, 761-4 and 760-6, is re-routed. The new route passes through links 760-1, 760-2, 760-3, 760-4, 760-5, and 760-6. In the example shown in FIG. 7, a failure in backbone switch 731-3 involves a re-routing that begins in TOR switch 711-1, changing from link 761-1 to link 760-2. Thus, in the exemplary scenario a failure in the backbone layer produces a readjustment two layers 'south,' at the TOR level.

Figure 8:
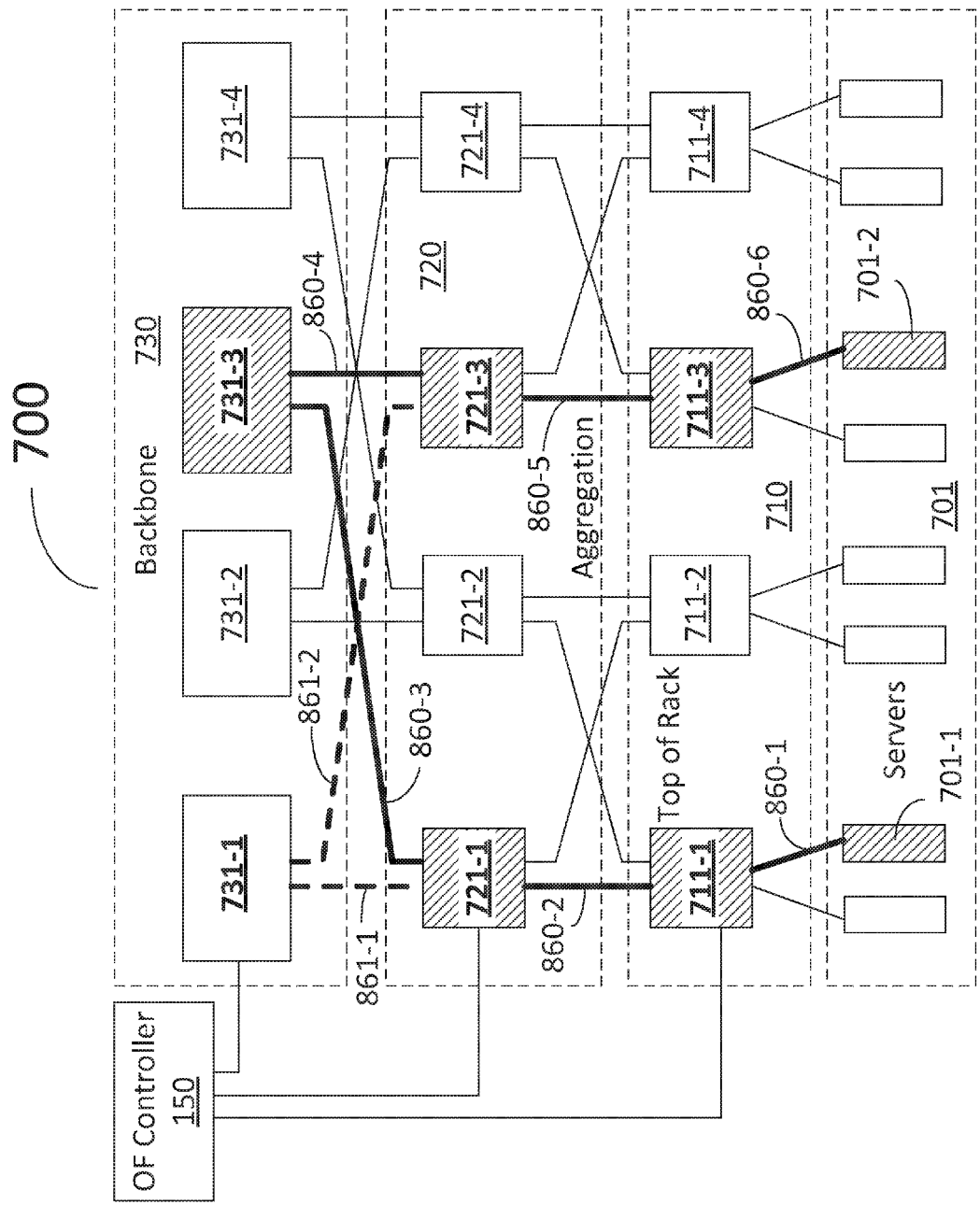
FIG. 8 shows a data center network configured for a link failure recovery, according to some embodiments.

FIG. 8 shows data center network 700 configured for a link failure recovery, according to some embodiments. Data center 700 may be configured for FRR orchestration using bidirectional forwarding detection (BFD) between two nodes of the network, in case of a link failure.

FIG. 8 shows an exemplary scenario wherein a failure is detected in either one of link 861-1 or link 861-2. Thus, a data packet route from server 701-1 to server 701-2 through links 860-1, 860-2, 861-1, 861-2, 860-5, and 860-6, is re-routed. The new route passes through links 860-1, 860-2, 860-3, 860-4, 860-5, and 860-6.

In some embodiments, OF controller 150 computes multiple FRR paths associated with each link in data center network 700. For example, multiple FRR paths may be associated to link 861-1 such that each of the FRR paths is able to transfer a data packet from source server 701-1 to destination server 701-2 assuming a failure of link 861-1. Thus, the path including links 860-1, 860-2, 860-3, 860-4, 860-5, and 860-6, and TOR switch 711-1, aggregation switch 721-1, backbone switch 731-3, aggregation switch 721-3, and TOR switch 711-3 may be included in an FRR set associated to either one of links 861-1, and 861-2. In some embodiments, OF controller 150 computes FRR paths for protection against a combination of a link failure and a node failure. In such embodiments, an FRR path set may be associated to both the link and the node whose failure is recovered. Further according to some embodiments, OF controller 150 may compute FRR paths in combination with user input, so that an administrator may select the type of protection path needed or desired for a data center network.

Accordingly, BFD sessions are performed between pairs of nodes, sending hand-shaking packets back and forth between the two nodes. When a BFD session between a pair of nodes reports a switch failure or a link failure, then the device which detects the failure reports the failure to the OF agent associated with the device. The OF agent in the device that detects the failure directs the flow to a backup path selected from the FRR set stored in memory.

In some embodiments, a user may select a recovery path from a group of FRR paths for a failed link and FRR paths for a failed switch, where the failed link and the failed switch may not be directly coupled to each other. In such scenario, OF controller 150 may configure the network to select the appropriate recovery path.

Some embodiments may implement a multi-hop BFD strategy, wherein the hand shaking packets are sent across multiple nodes and links in data center network 700. For example, a multi-hop configuration may use a BFD session between two nodes in TOR layer 710, so that the hand-shake packet transits across aggregation layer 720 and backbone layer 730. In some embodiments, a BFD session may provide hand-shake packets between two nodes in aggregation layer 720, across backbone layer 730. More generally, some embodiments may implement multi-hop BFD sessions within a single layer and across multiple nodes, using an East-West links between switches (cf. FIG. 1).

In some embodiments, a single-hop BFD session coupling two adjacent nodes through a single link may take less than 50 milliseconds (ms) to complete. In the case of a multi-hop BFD session, latency times may be higher than 50 ms, but well below one (1) sec.

Thus, according to embodiments consistent with the present disclosure recovery through FRR paths may be implemented locally, through an OF agent associated to a switch, rather than being implemented at the OF controller level. This reduces the latency for implementation of the recovery protocol.

Embodiments of the disclosure described above are exemplary only. One skilled in the art may recognize various alternative embodiments from those specifically disclosed. Those alternative embodiments are also intended to be within the scope of this disclosure. As similar to such, the invention is limited only by the following claims.

What is claimed is:

1. A network managing device comprising:
one or more network ports coupling the network managing device to a plurality of switches;
a memory storing commands and data; and
a processing circuit coupled to the memory and the one or more network ports, the processing circuit being configured to:
discover a topology of a network comprising the plurality of switches;
determine a path for network traffic between a source and a destination based on the topology;
determine a fail re-route (FRR) path set for a first switch from the plurality of switches along the path, the FRR path set including a point of failure specific FRR path for each potential point of failure along the path between the first switch and the destination, each of the FRR paths in the FRR path set including an instruction to the first switch to perform a push, swap, or pop label operation; and
provide the FRR path set to the first switch for use by the first switch to reroute the network traffic when a failure along the path is detected by the first switch and without the first switch involving the network managing device when the failure is detected.

2. The network managing device of claim 1, wherein the failure is a link failure.

3. The network managing device of claim 1, wherein the failure is a switch failure.

4. The network managing device of claim 1, wherein the failure is a combination of a switch failure and a link failure.

5. The network managing device of claim 1, wherein the network managing device is an open flow controller.

6. The network managing device of claim 1, wherein the processing circuit is further configured to receive notification of the failure from the first switch.

7. The network managing device of claim 1, wherein the processing circuit is further configured to:
determine traffic rates on a first link along the path; and
in response to determining that the traffic rates on the first link exceed a threshold, send one or more commands to one or more of the plurality of switches to direct network traffic away from the first link.

8. The network managing device of claim 7, wherein the one or more commands comprise a command to one of the plurality of switches to perform a push label operation or a swap label operation.

9. The network managing device of claim 1, wherein:
the path is a label switch path; and
the processing circuit is further configured to:
send a first command to a forwarding switch to perform a push label operation;
send a second command to a receiving switch to perform a pop label operation; and
send one or more third commands to one or more second switches to perform a swap label operation.

10. The network managing device of claim 1, wherein the processing circuit is further configured to determine the path and the FRR path set in response to detecting a start of a flow.

11. A switch comprising:
one or more network ports coupling the switch to a network managing device and a plurality of other switches;
a memory storing commands and data; and
a processing circuit coupled to the memory and the one or more network ports, the processing circuit being configured to:
receive, from the network managing device, instructions for forwarding network traffic along a path between a source and a destination;
receive, from the network managing device, a fail re-route (FRR) path set, the FRR path set including a point of failure specific FRR path for each potential point of failure along the path between the switch and the destination, each failure specific FRR path including an instruction to the switch to perform a push, swap, or pop label operation;
exchange hand-shake packets with one or more of the other switches along the path between the switch and the destination;
detect a failure along the path between the switch and the destination; and
reroute the network traffic to the destination along a FRR path from the FRR path set that corresponds to the detected failure without involving the network managing device.

12. The switch of claim 11, wherein the failure is a link failure, a switch failure, or a combination of a switch failure and a link failure.

13. The switch of claim 11, wherein the network managing device is an open flow controller.

14. The switch of claim 11, wherein the processing circuit is further configured to report the failure to the network managing device.

15. The switch of claim 11, wherein the instructions for forwarding network traffic along the path comprise an instruction to perform a push label operation, a swap label operation, or a pop label operation.

16. The switch of claim 11, wherein the hand-shake packets are bidirectional forwarding detection (BFD) packets.

17. An information handling system comprising:
a network managing device comprising one or more first network ports coupling the network managing device to a plurality of first switches, a first memory storing commands and data, and a first processing circuit coupled to the first memory and the one or more first network ports; and
a second switch comprising one or more second network ports coupling the second switch to the network managing device and the plurality of first switches, a second memory storing commands and data, and a second processing circuit coupled to the second memory and the one or more second network ports;
wherein the network managing device is configured to:
discover a topology of a network comprising the plurality of first switches and the second switch;
determine a path for network traffic between a source and a destination based on the topology, the second switch being located on the path;
determine, in response to detecting a start of a flow, a fail re-route (FRR) path set for the second switch, the FRR path set including a point of failure specific FRR path for each potential point of failure along the path between the second switch and the destination; and
provide the FRR path set to the second switch;
wherein the second switch is configured to:
exchange hand-shake packets with one or more of the first switches along the path between the second switch and the destination;
detect a failure along the path between the second switch and the destination; and
reroute the network traffic to the destination along a FRR path from the FRR path set that corresponds to the detected failure without involving the network managing device.

18. The information handling system of claim 17, wherein the failure is a link failure, a switch failure, or a combination of a switch failure and a link failure.

19. The information handling system of claim 17, wherein the network managing device is an open flow controller.

20. The information handling system of claim 17, wherein the second switch is further configured to report the failure to the network managing device.

* * * * *